United States Patent
Fowles et al.

[19]

[11] Patent Number: 6,123,240
[45] Date of Patent: Sep. 26, 2000

[54] WEARABLE HANGING PAGER POUCH

[76] Inventors: Lorraine M Fowles; Charlotte P Worsley, both of 111-45 145th St., Jamaica, N.Y. 11413

[21] Appl. No.: 09/175,509

[22] Filed: Oct. 20, 1998

[51] Int. Cl.[7] .................................................. A45C 13/30
[52] U.S. Cl. .................... 224/600; 224/219; 224/610; 224/614; 224/615; 224/616; 224/623; 224/930
[58] Field of Search .................................. 224/610, 929, 224/930, 600, 607, 614, 615, 616, 623, 666, 219, 907; 383/106, 86; 206/719, 721; 150/107; 174/35 R; D3/218

[56] References Cited

U.S. PATENT DOCUMENTS

| | | | |
|---|---|---|---|
| D. 306,654 | 3/1990 | Brown | D3/30.1 |
| D. 343,059 | 1/1994 | Daniels et al. | D3/218 |
| D. 398,777 | 9/1998 | Epstein | D3/218 |
| 1,575,875 | 3/1926 | Szewczyk | 224/580 |
| 4,658,958 | 4/1987 | McNulty et al. | 206/328 |
| 4,687,036 | 8/1987 | Thomas | 150/118 |
| 4,746,043 | 5/1988 | Booker | 224/219 |
| 4,801,059 | 1/1989 | Hayes | 224/240 |
| 4,901,852 | 2/1990 | King | 206/320 |
| 4,951,817 | 8/1990 | Barletta et al. | 206/305 |
| 5,285,833 | 2/1994 | Haxby | 150/102 |
| 5,353,975 | 10/1994 | Libertucci | 224/224 |
| 5,360,111 | 11/1994 | Arispe | 206/361 |
| 5,598,926 | 2/1997 | Vogt | 206/457 |
| 5,829,657 | 11/1998 | Romer, Jr. | 224/610 |
| 5,927,581 | 7/1999 | Reddy et al. | 224/578 |

*Primary Examiner*—Gregory M. Vidovich
*Assistant Examiner*—Maerena W. Brevard
*Attorney, Agent, or Firm*—Michael I Kroll

[57] ABSTRACT

A carrying case for a pager including a pouch having first and second compartments. The first compartment is sized to receive the pager therein and the second compartment is provided for receiving other items such as a credit card, driver's license, money, etc. which the user may need. A shield is positioned between the first and second compartments for shielding any items within the second compartment from being damaged by and electromagnetic waves produced by the beeper. This shield will aid in preventing such electromagnetic waves from erasing or damaging the magnetic strip on a credit card or bank card. A cover is provided for selectively covering the first and second compartments to thereby secure the beeper within said first compartment and whereby the beeper is fully operational when positioned within the first compartment and covered by the cover. A chain may be connected to the pouch for retaining the pouch around a body part of a user.

6 Claims, 12 Drawing Sheets

WEARABLE HANGING PAGER POUCH

BACKGROUND OF THE INVENTION

1. Field of the Invention

The present invention relates generally to carrying cases and, more specifically, to a compact, lightweight wearable carrying case for a pager including a number of attachment points for connection with a decorative chain or cord thereby allowing the pouch to be worn around the neck and an inner pocket for retaining items such as a credit card, phone card or similar items. The pouch providing access to all of the functions of the pager without the need to remove the pager therefrom.

2. Description of the Prior Art

Numerous types of carrying cases have been provided in the prior art. For example, U.S. Pat. Nos. Des 379,118; Des. 329,750; Des. 366,757 and 5,511,702 all are illustrative of such prior art. While these units may be suitable for the particular purpose to which they address, they would not be as suitable for the purposes of the present invention as heretofore described.

U.S. Pat. No. Des 379,118

Inventor: Celina X. Wilson

Issued: May 13, 1997

This United States patent discloses an ornamental design for a beeper pouch as illustrated in the drawings of the patent. The pouch includes a compartment for retaining the beeper therein and a strap attached thereto for retaining the pouch around the waist of a user.

U.S. Pat. No. Des 329,750

Inventor: John A. Gilmore et al

Issued: Sep. 29, 1992

This United States patent discloses an ornamental design for a pager carrying case as illustrated in the drawings of the patent. The case includes a cover which may be secured in a closed position with Velcro and a key chain extending therefrom.

U.S. Pat. No. Des 366,757

Inventor: Ralph A. Marino et al

Issued: Feb. 6, 1996

This United States patent discloses an ornamental design for a flexible carrying case for a pager as illustrated in the drawings of the patent. The case includes a cover which when in a closed position extends across one side of the case and around to the opposing side. A hook latch is also provided on the cover for attaching the case to an article of clothing.

U.S. Pat. No. 5,511,702

Inventor: Chin Y. Yang

Issued: Apr. 30, 1996

A wrist strap used for carrying a pager is provided. The wrist strap includes a strap which provides accommodation for a pager within a pocket, the pager being visible through a transparent surface of a display window for reading messages from the pager. One end of the wrist strap extends to form a band and the other end is provided with a side loop. With the aid of an easy to use fastening system disposed on the band, the band can pass around a user's wrist and through a side loop, and then folded over the side loop to be fastened to itself. The band also forms a closure for the pocket as it passes around the user's wrist. Thus users can wear the strap on their wrists and conveniently read the messages shown in the display window of the pager.

SUMMARY OF THE PRESENT INVENTION

The present invention relates generally to carrying cases and, more specifically, to a compact, lightweight wearable carrying case for a pager including a number of attachment points for connection with a decorative chain or cord thereby allowing the pouch to be worn around the neck and an inner pocket for retaining items such as a credit card, phone card or similar items. The pouch providing access to all of the functions of the pager without the need to remove the pager therefrom.

An object of the present invention is to provide a carrying case for a pager that will overcome the shortcomings of prior art devices.

A further object of the present invention is to provide a carrying case for a pager which is compact, lightweight decorative and wearable.

A yet further object of the present invention is to provide a carrying case for a pager which eliminates the need to wear a clothing to which a clip is attachable.

Another object of the present invention is to provide a carrying case for a pager wherein the material of said carrying case does not impede access to the buttons and switches of the pager.

Yet another object of the present invention is to provide a carrying case for a pager to which an interchangeable decorative chain or cord may be attached whereby an individual can hang carrying case from their person, such as, around their neck.

Another object of the present invention is to provide a carrying case for a pager including pocket and an electromagnetic shield for shielding items carried within the pocket which may be adversely affected by a magnetic field or for individuals who feel a magnetic field poses a health issue.

Another object of the present invention is to provide a carrying case for a pager that is simple and easy to use.

A still further object of the present invention is to provide a carrying case for a pager that is economical in cost to manufacture.

Additional objects of the present invention will appear as the description proceeds.

A carrying case for a pager is disclosed by the present invention. The carrying case for a pager includes a pouch having first and second compartments. The first compartment is sized to receive the pager therein and the second compartment is provided for receiving other items such as a credit card, driver's license, money, etc. which the user may need. A shield is positioned between the first and second compartments for shielding any items within the second compartment from being damaged by and electromagnetic waves produced by the beeper. This shield will aid in preventing such electromagnetic waves from erasing or damaging the magnetic strip on a credit card or bank card. A cover is provided for selectively covering the first and second compartments to thereby secure the beeper within said first compartment and whereby the beeper is fully operational when positioned within the first compartment and covered by the cover. A chain may be connected to the pouch for retaining the pouch around the neck of a user.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Turning now descriptively to the drawings, in which similar reference characters denote similar elements throughout the several views, the Figures illustrate the carrying case for a pager of the present invention. With regard to the reference numerals used, the following numbering is used throughout the various drawing figures.

10 carrying case for a pager of the present invention
 12 person wearing carrying case for a pager
 14 pouch for receiving pager
 16 detachable chain connected to compartment
 18 series of arcs emanating from the compartment indicative of alarm signal
 20 beeper
 22 display of beeper
 24 cover of compartment
 26 first end of chain
 28 second end of chain
 30 means for securing cover to pouch
 32 rings connected to pouch
 34 hook connected to first end of chain
 36 hook connected to second end of chain
 38 snap
 40 snap receiving clasp
 42 wall dividing inside of pouch
 44 first compartment
 46 second compartment
 48 card held within second compartment
 50 entrance to pouch
 52 arrows indication direction of insertion of card into second compartment
 54 electromagnetic shield

DETAILED DESCRIPTION OF THE PREFERRED EMBODIMENT

Turning now descriptively to the drawings, in which similar reference characters denote similar elements throughout the several views, FIGS. 1 through 12 illustrate the carrying case for a pager of the present invention indicated generally by the numeral 10.

Figure 1:
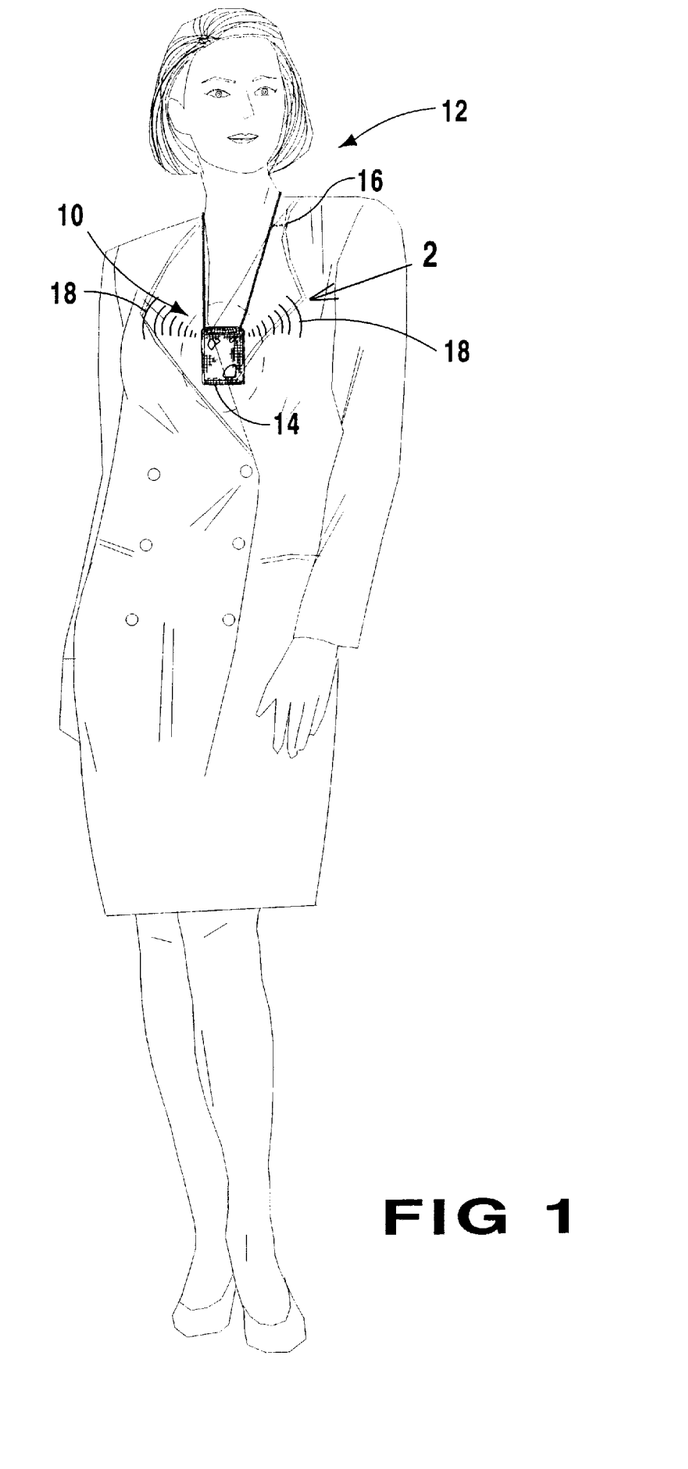
FIG. 1 is a perspective view of the carrying case for a pager of the present invention being worn around the neck of a user.

The carrying case for a pager 10 is shown in FIG. 1 being worn by a person around their neck. The carrying case for a pager 10 includes a pouch 14 for retaining a pager or the like therein and a chain 16 detachably connected to the pouch 14. The chain 16 should be of a length able to reach comfortably around the neck of the user 12 without impeding the motion of the user 12. Alternatively, the chain 16 may be in the form of a bracelet allowing the user to wear the carrying case for a pager 10 around a wrist. As can also be seen from this figure, the pouch 14 is made of a material which will not impede the operation of the pager allowing the alarm signal to be heard by the user. The alarm signal is indicated by the series of arcs emanating from the compartment and labeled with the numeral 18. Furthermore, the user 12 is not required to wear clothing to which a clip may be attached for carrying a pager as the carrying case for a pager 10 fits comfortably around their neck.

Figure 2:
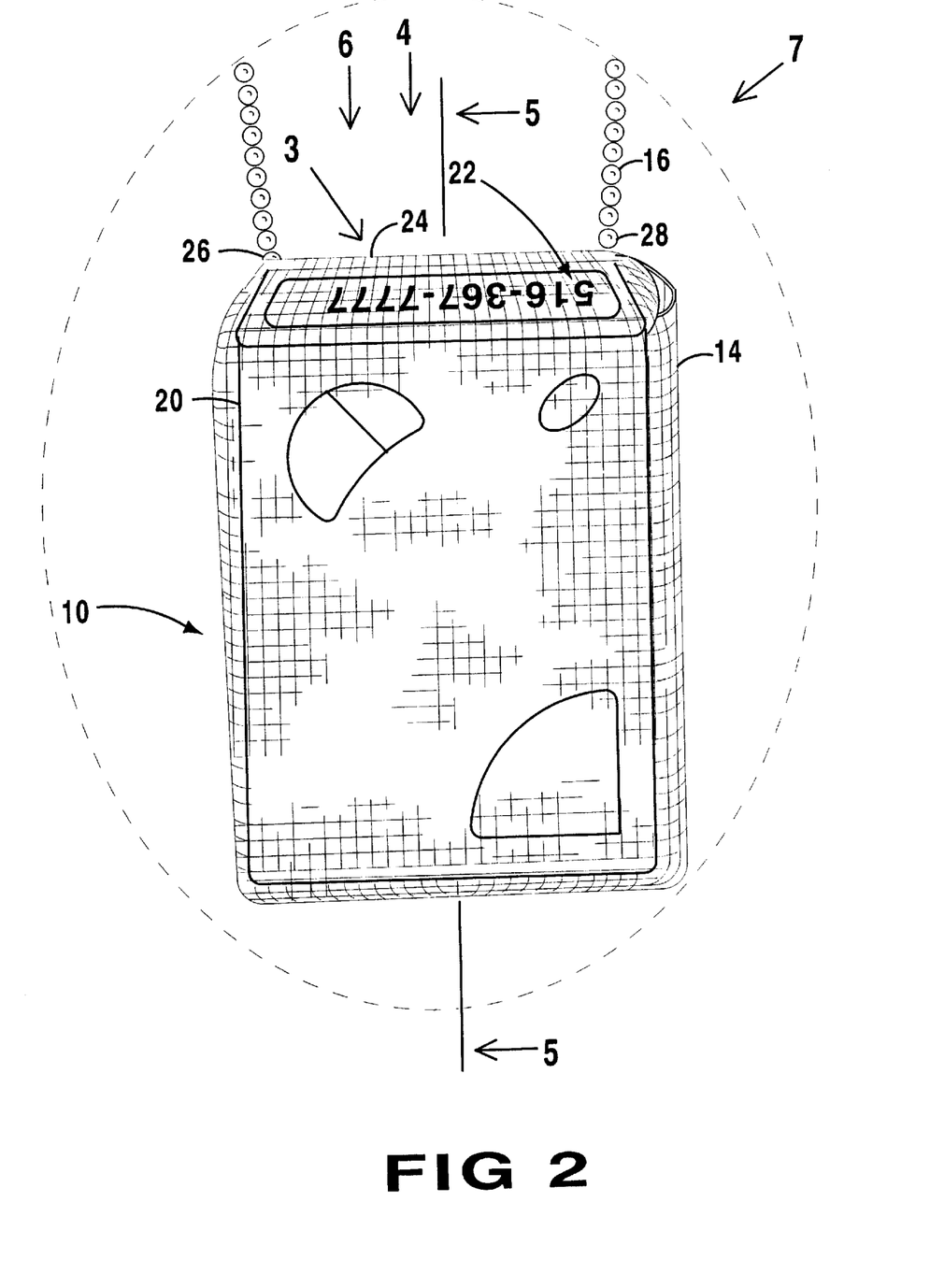
FIG. 2 is an enlarged view of the carrying case for a pager of the present invention taken from within the circle labeled 2 in FIG. 1 with a pager enclosed therein.

An enlarged view of the carrying case for a pager 10 including a pager 20 contained within the pouch 14 is illustrated in FIG. 2. From this view a pager 20 including a display 22 on one side thereof is shown within the carrying case 10. A cover 24 is provided to selectively cover the pouch 14 of the carrying case for a pager 10. The cover 24 is made of a material able to allow the display 22 to be viewed by a user therethrough. The chain 16 is shown as including first and second ends 26 and 28, both the first and second ends 26 and 28 being connected to the pouch 14.

Figure 3:
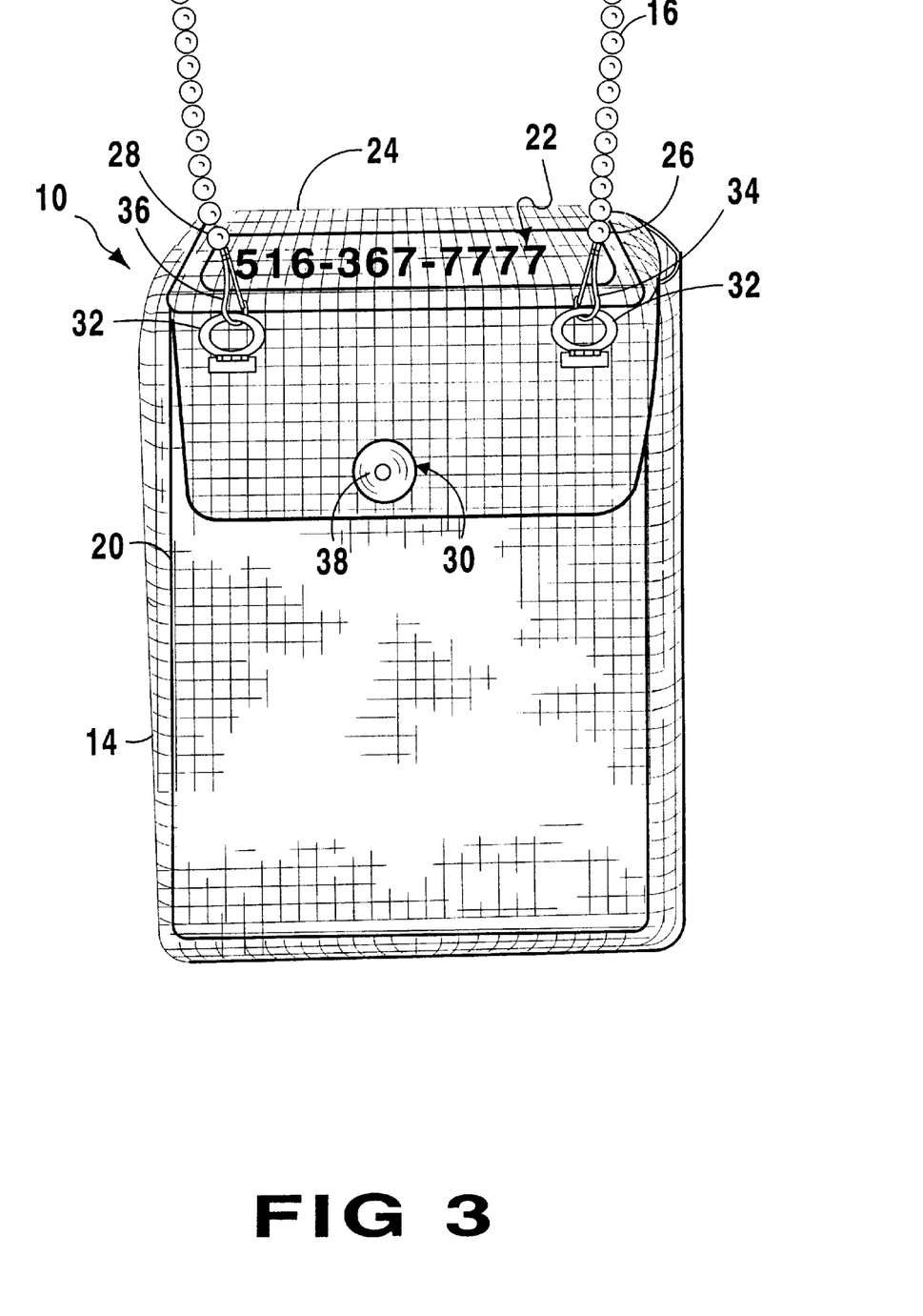
FIG. 3 is a back perspective view of the carrying case for a pager of the present invention including a decorative chain fastened thereto taken in the direction of the arrow labeled 3 of FIG. 2.

A view of the carrying case for a pager 10 taken in the direction of the arrow labeled 3 in FIG. 2 is illustrated in FIG. 3. As can be seen from this view, the cover 24 includes a securing device 30 for selectively securing the cover 24 to the pouch 14 and thereby securing the modem 20 within the pouch 14. Positioned on the cover 24 is a snap 38 which engages a snap receiving clasp positioned on the pouch 14. When the snap 38 is received by the snap receiving clasp the cover is releasably secured to the pouch 14 thereby covering the pouch 14 and securing anything within the pouch 14 therein.

While a preferred structure for releasably securing the cover 24 to the pouch 14 is shown and described herein, those of ordinary skill in the art who have read this description will appreciate that there are numerous other structures for releasably securing the cover 24 to the pouch 14 and, therefore, as used herein the phrase "means for releasably securing the cover 24 to the pouch 14" should be construed as including all such structures as long as they achieve the desired result of releasably securing the cover 24 to the pouch 14, and therefore, that all such alternative mechanisms are to be considered as equivalent to the one described herein.

The first and second ends 26 and 28 of the chain 16 are also releasably secured to the pouch 14 or, as illustrated in the figure, to the cover 24. On either side of the cover 24 is a ring clasp 32. A first hook 34 is connected to the first end 26 of the chain 16 and a second hook 36 is connected to the second end 28 of the chain 16. The first and second hooks 34 and 36 each engage a respective ring clasp 32 for connecting the chain 16 to the pouch 14 and thereby allow the carrying case for a pager 10 to be worn by the user.

While a preferred structure for connecting the chain 16 to the pouch 14 is shown and described herein, those of ordinary skill in the art who have read this description will appreciate that there are numerous other structures for connecting the chain 16 to the pouch 14 and, therefore, as used herein the phrase "means for connecting the chain 16 to the pouch 14" should be construed as including all such structures as long as they achieve the desired result of connecting the chain 16 to the pouch 14, and therefore, that all such alternative mechanisms are to be considered as equivalent to the one described herein.

Figure 4:
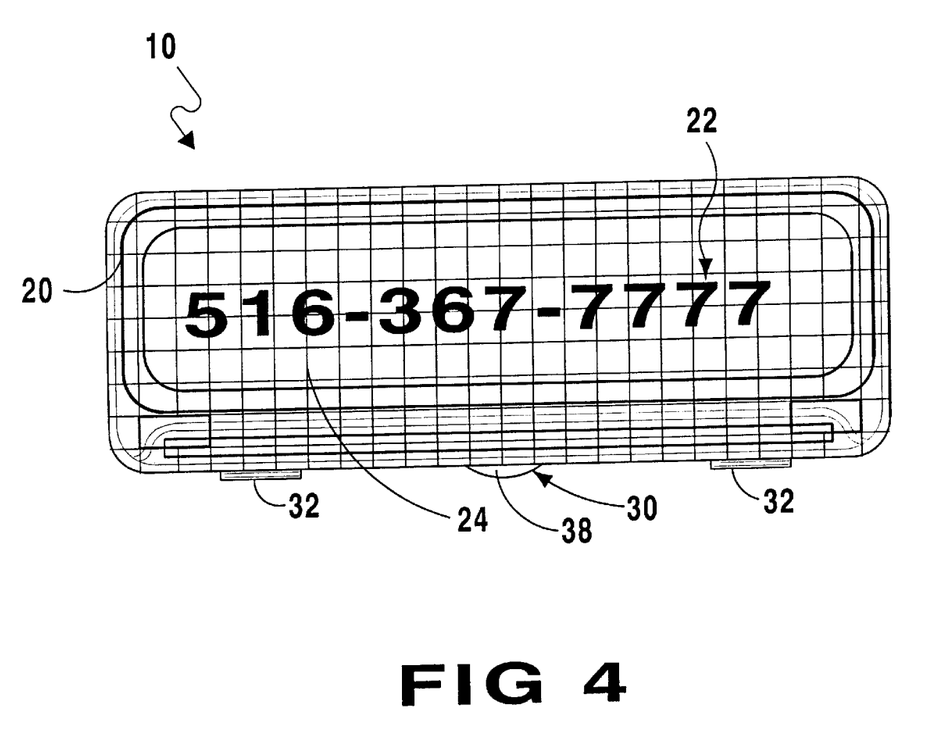
FIG. 4 is a top plan view of the carrying case for a pager of the present invention taken in the direction of the arrow labeled 4 of FIG. 2.

A top view of the carrying case for a pager 10 taken in the direction of the arrow labeled 4 in FIG. 2 is illustrated in FIG. 4. This view illustrates the cover 24 positioned to cover the beeper 20 and may also provide a view of the display 22 of the beeper 20 therethrough. The chain 16 is detached from the pouch 14 in this view however, the rings 32 are seen as connected to a side of the pouch 14. The snap 38 of the device 30 for securing the cover 24 to the pouch 14 can also be seen as protruding from a side of the cover 24 of the carrying case for a pager 10.

Figure 5:
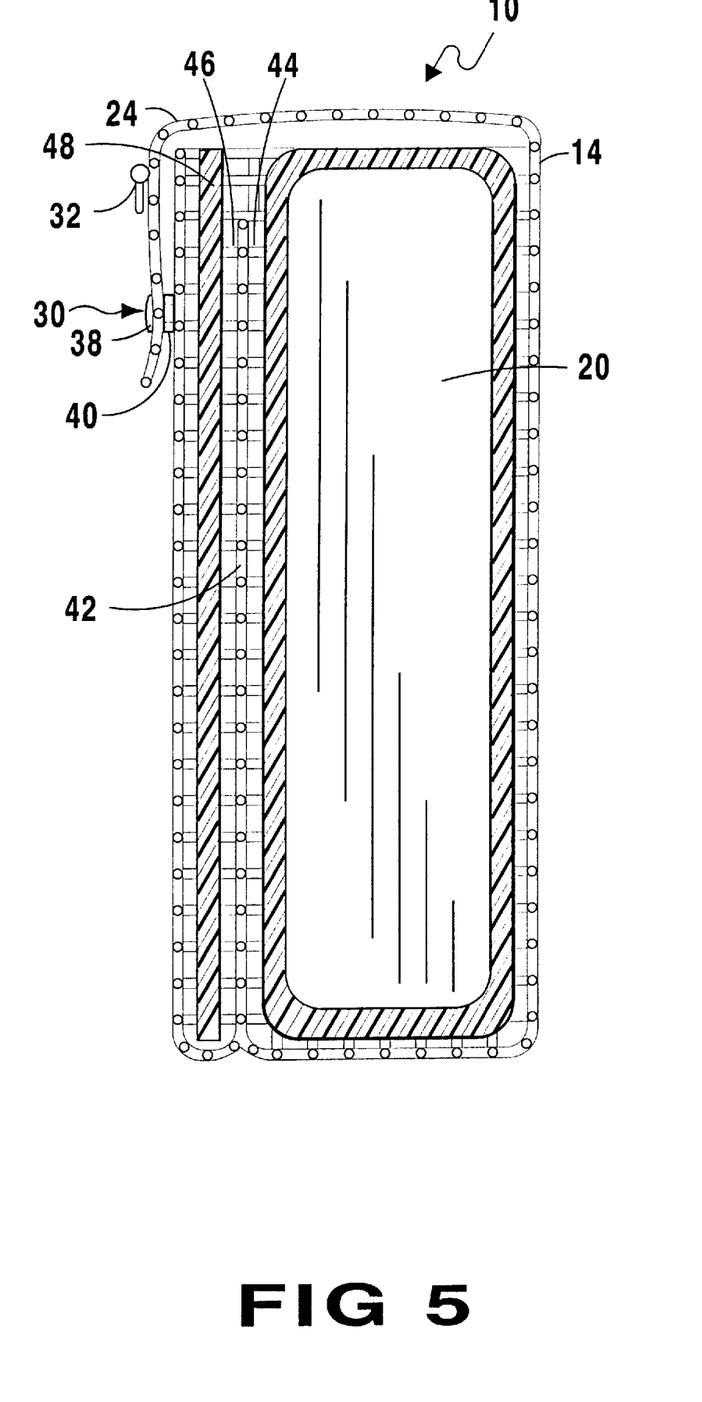
FIG. 5 is a cross sectional view of the carrying case for a pager of the present invention, taken along the line 5—5 of FIG. 2.

A side cross-sectional view of the carrying case for a pager 10 taken along the line 5-5 of FIG. 2 is shown in FIG. 5. From this view, one of the rings 32 can be seen extending from the cover 24 for engaging a hook on an end of the chain. Positioned below the ring 32 is the device for selectively securing the cover 24 to the pouch 14. The snap 38 is connected to the cover 14 and the snap receiving clasp 40 is connected to the pouch 14. When the cover 24 is desired to be secured to the pouch 14 and prevent entry into the pouch 14, a force is exerted on the snap 38 towards the snap receiving clasp 40 causing the snap 38 to be received by the snap receiving clasp 40. Positioned within the pouch 14 is an interior wall 42. The interior wall 42 divides the inside of the pouch 14 into a first compartment 44 for receiving a pager 20 and a second compartment 46 for receiving other items such as a credit card 48.

Figure 6:
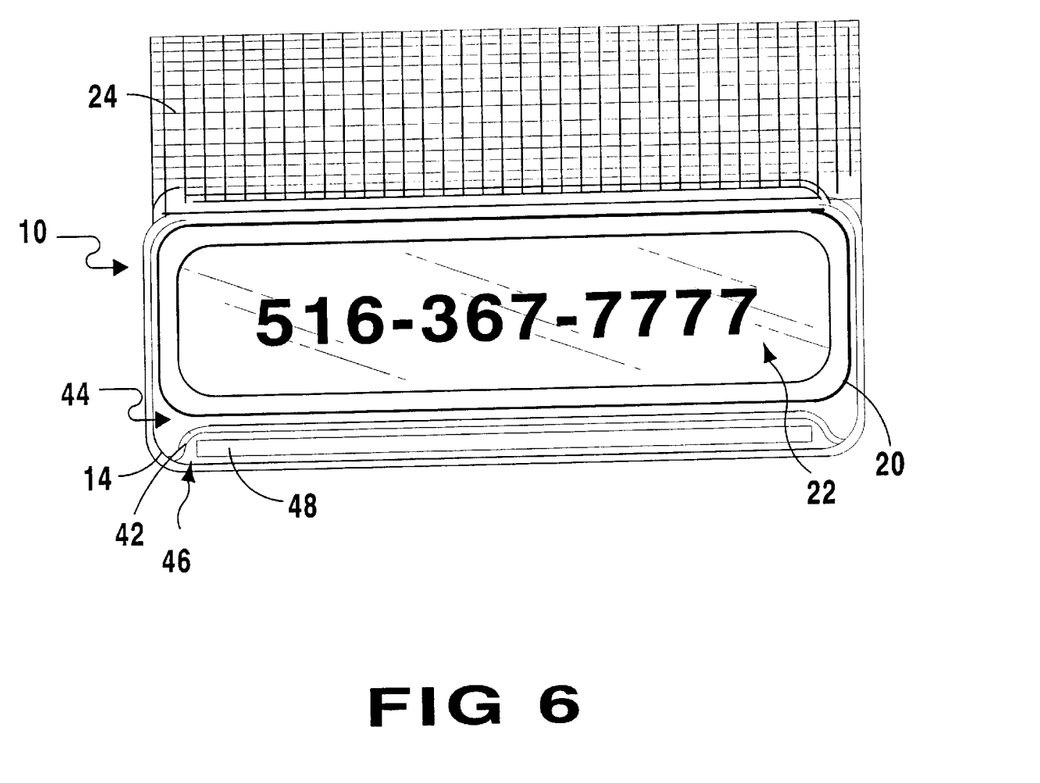
FIG. 6 is a top plan view of the carrying case for a pager of the present invention taken in the direction of the arrow labeled 6 in FIG. 2.

A top view of the carrying case for a pager 10 with the cover in an open position unsecured to the pouch 14 and providing access to the pager 20 is illustrated in FIG. 6. From this view, the pager 20 and the display 22 of the pager 20 are clearly seen. The pager 20 is positioned in the first compartment 44 and a credit card or some other form of identification card 48 is positioned in the second compartment 46. The card 48 and the pager 20 are separated by the dividing wall 42.

Figure 7:
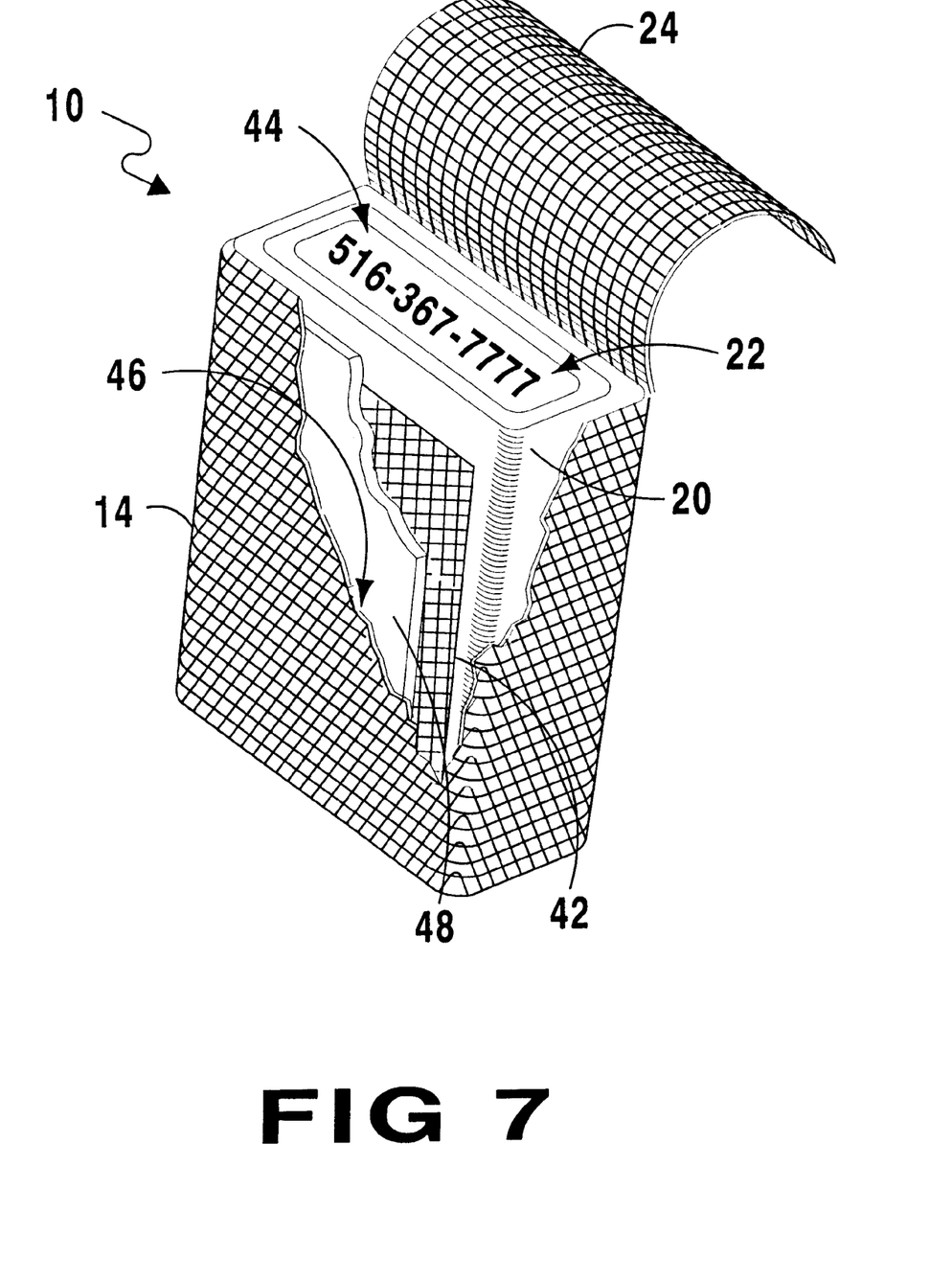
FIG. 7 is a top perspective view with parts cut away of the carrying case for a pager of the present invention taken in the direction of the arrow labeled 7 of FIG. 2.

A perspective view of the carrying case for a pager 10 with parts cut away is illustrated in FIG. 7. This view clearly shows the dividing wall 42 separating the first and second compartments 44 and 46, respectively. The first compartment 44 has a pager 20 positioned therein and the second compartment 46 includes a credit card 48 received therein.

Figure 8:
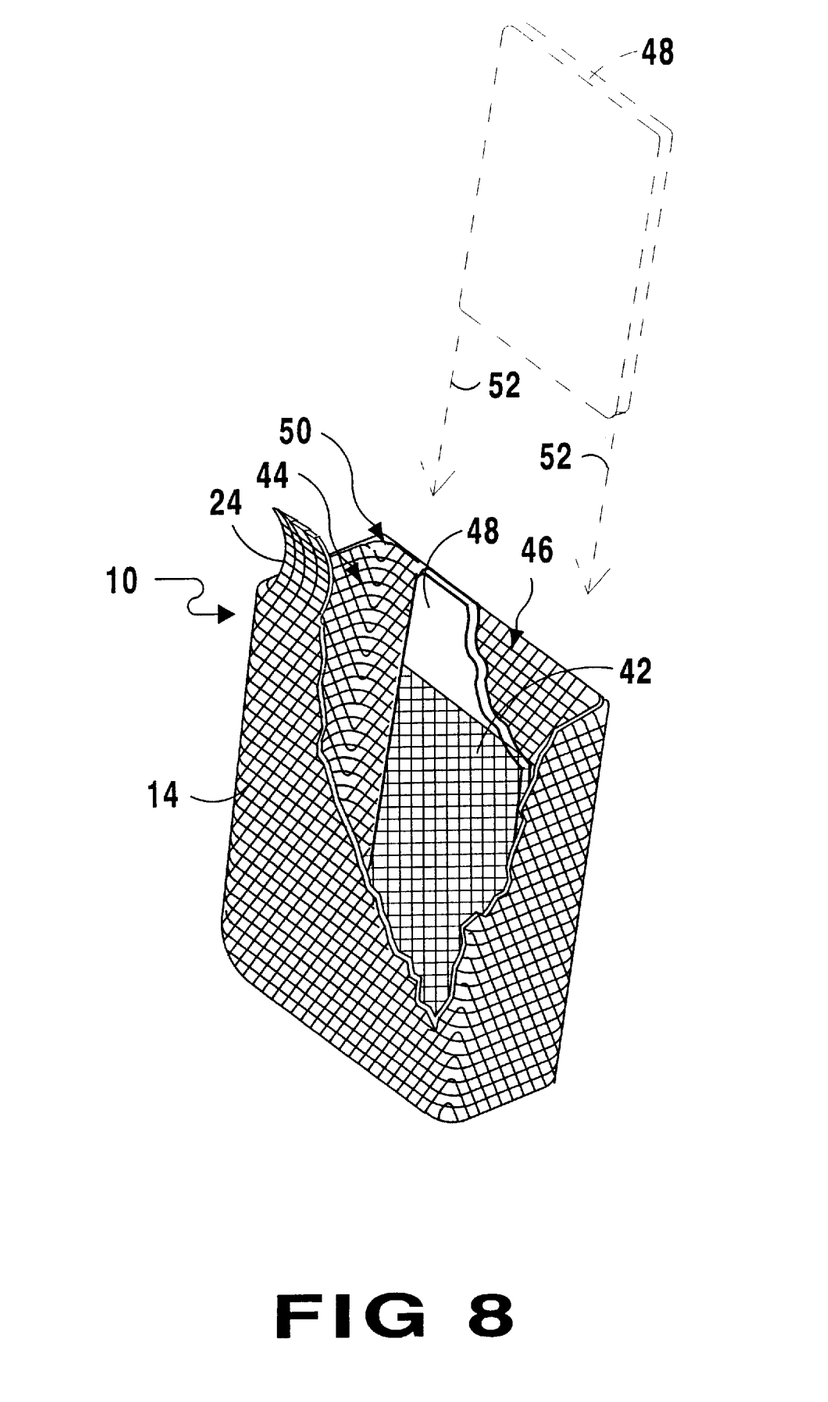
FIG. 8 is a top perspective view with parts cut away of the carrying case for a pager of the present invention showing a card positioned within a pocket and a pager in dashed lines and indicating the direction of placement of the pager into the carrying case.

Insertion of the credit card 48 into the second compartment is illustrated in FIG. 8 also illustrating the carrying case for a pager 10 with parts cut away. In order to place the credit card 48 into the second compartment 46, the cover 24 must be in the open position thereby providing access to the second compartment 46. The card 48 is then inserted through an entrance 50 to the pouch 14 in the direction shown by the arrows labeled with the numeral 52. The card 48 is moved in the direction of the arrows 52 until fully inserted in the second compartment 46.

Figure 9:
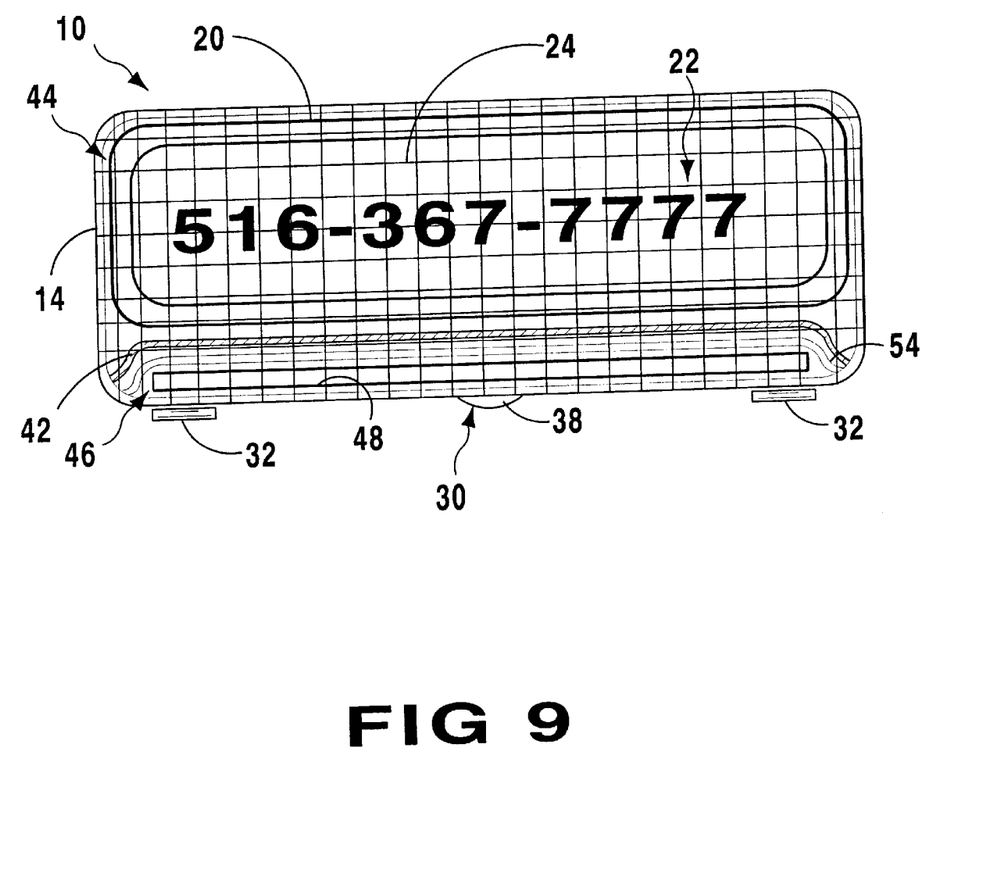
FIG. 9 is a top plan view of the carrying case for a pager of the present invention including an electromagnetic shield positioned therein.

FIG. 9 illustrates a top view of the carrying case for a pager 10 including an electromagnetic shield 54 positioned adjacent to the dividing wall 42 and acting to further separate the first and second compartments 44 and 46, respectively. The electromagnetic shield 54 protects any item positioned in the second compartment 46 from electromagnetic waves generated by and emitted from the pager 20. Thus, should a credit card or bank card 48 include a magnetic tape strip thereon, the electromagnetic shield 54 will prevent any electromagnetic waves from erasing the magnetic tape strip and thus rendering the credit or bank card 48 unuseable. The electromagnetic shield 54 will also protect the user from any potential health hazards which may be caused by exposure to these electromagnetic waves.

Figure 10:
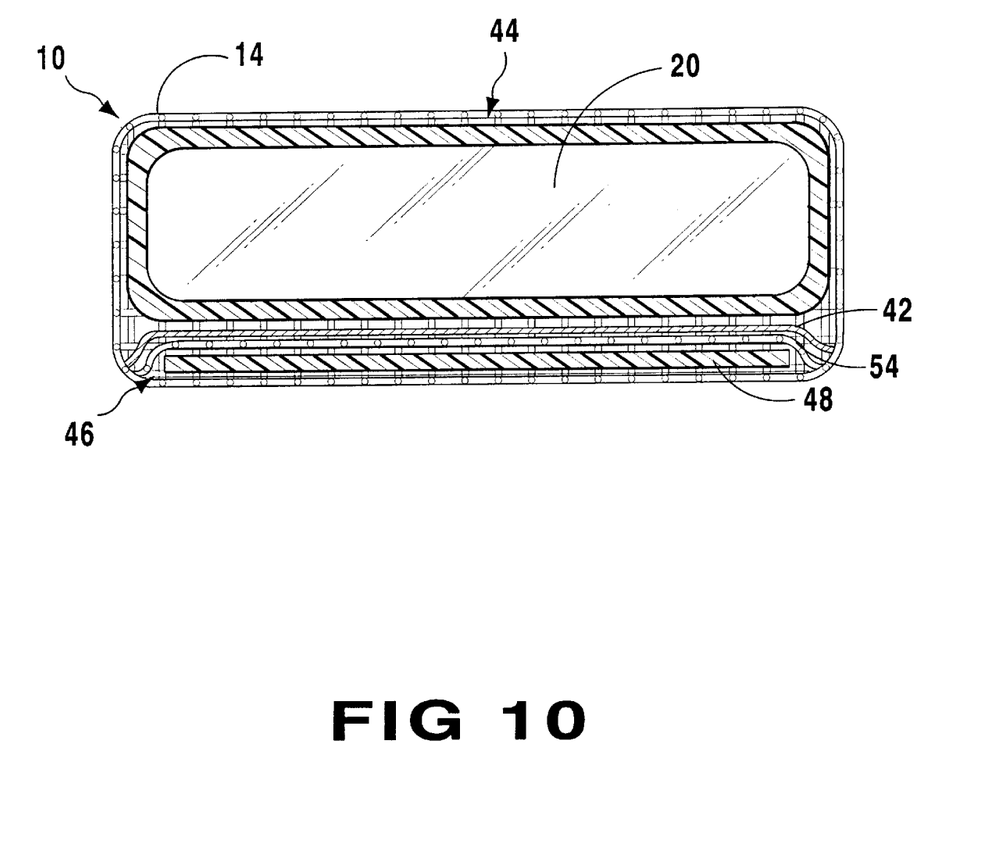
FIG. 10 is a top cross-sectional view of the carrying case for a pager of the present invention shown in FIG. 9.

FIG. 10 shows a cross-sectional view of the carrying case for a pager 10 including the electromagnetic shield 54 as seen in FIG. 9. This view is taken along a horizontal plane through the carrying case for a pager 10.

Figure 11:
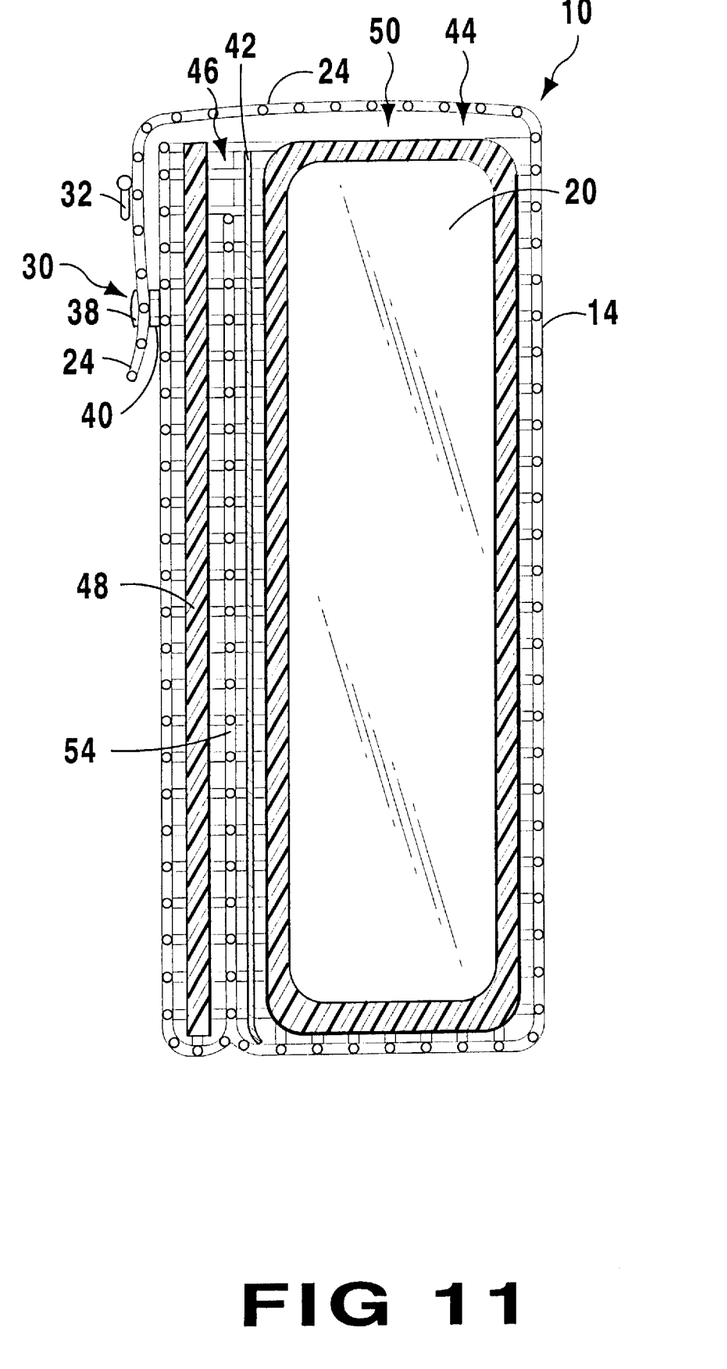
FIG. 11 is a side cross-sectional view of the embodiment of the carrying case for a pager of the present invention shown in FIG. 9.

FIG. 11 shows an alternate cross-sectional view of the carrying case for a pager 10 including the electromagnetic shield 54 as seen in FIG. 9. This view is taken along a vertical plane through the carrying case for a pager 10.

Figure 12:
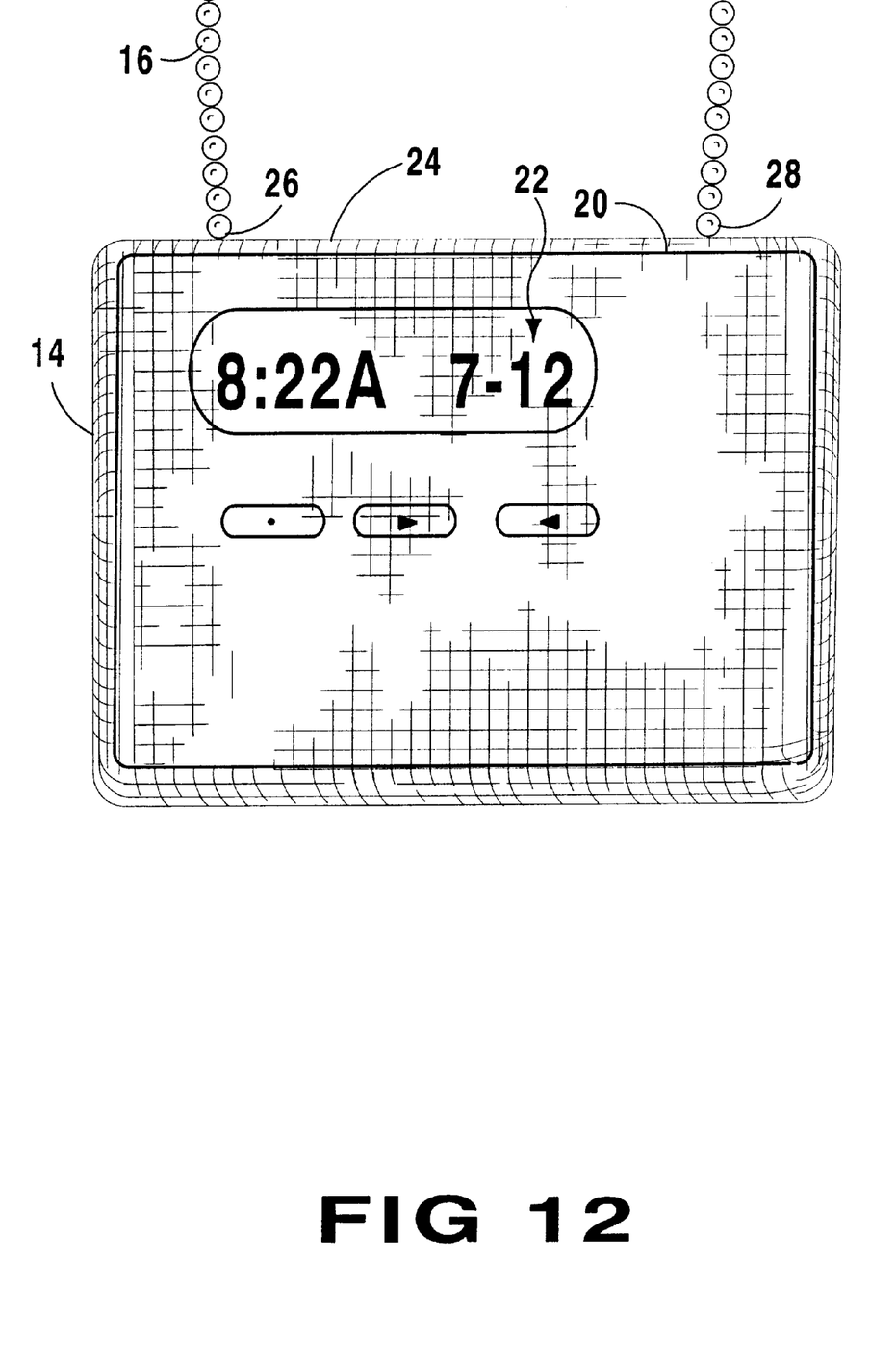
FIG. 12 is a front elevational view of the carrying case for a pager of the present invention including an alternate pager positioned therein with the chain connected to hold the carrying case oriented 90° from the embodiment shown in FIGS. 1–11.

An embodiment of the carrying case for a pager 10 is illustrated in FIG. 12 in which the pouch is turned 90° from the orientation shown in FIGS. 1–11. In this embodiment, the cover 24 and hooks are connected to a different side of the pouch 14 from that shown in FIGS. 1–11 and thereby allow the longer side of the pouch to define the entrance 50 into the first and second chambers 44 and 46.

The operation of the carrying case for a pager 10 will now be described with reference to the figures. In operation, the carrying case for a pager 10 is first assembled by positioning the electromagnetic shield 54 in the second compartment 46 if desired. The electromagnetic shield 54 may alternatively be positioned within the first compartment 46 between the dividing wall 42 and the pager 20. The first end 26 of the chain 16 is then secured to a respective one of the rings 32 and the second end 26 of the chain 16 is then secured to the other one of the rings 32. The carrying case for a pager 10 is now assembled.

The user will now open the cover to reveal the entrance 50 and place the pager 20 in the first compartment 44. The pager 20 should be positioned such that the user can view the display 22 through the cover 24 or side wall of the pouch 14. The user will then place any cards, identification, currency or the like 48 in the second compartment 46. If the electromagnetic shield 54 is positioned in the second compartment 46 the cards, identification, currency or the like 48 positioned therein is positioned between the electromagnetic shield 54 and a wall of the pouch 14. The cards, identification, currency or the like 48 should not be positioned between the electromagnetic shield 54 and the dividing wall 42. Doing such will eliminate the effect and purpose of placing the electromagnetic shield 54 in the second compartment 46.

The user will now secure the cover 24 to the pouch 14 and thereby close the entrance 50 by securing the fastening device 30. Once the cover 24 is secured to the pouch 14, the carrying case 10 may be placed around the neck of the user or secured to the user's wrist. The pager 20 and any other items desired can now be carried by the user in an unobtrusive and easily transportable manner. When it is desired to place the pager 20 down the user will simply remove the chain 16 from around the neck, release the cover 24 and remove the pager 20 and any other items desired from within the first and second compartments 44 and 46, respectively.

The pouch 14 can be designed to match any outfit the user may wear and thus be suitable for use at work, play or when going out at night. The pouch 14 may also connect with any of a plurality of chains 16 to thereby add to the appearance of the carrying case and match with the outfit of the user.

A further aspect of the pager pouch 14 is that its size may be modified to accomodate varying sizes of pagers and a be fabricated from a wide array of fabrics and materials, e.g. skins, plastics, canvas, etc. The pager pouch 14 is therefore able to be used for accenting or coordinating with various or varying wardrobes and still allow access to the pager functions without removal of the pager from the pouch 14.

From the above description it can be seen that the carrying case for a pager of the present invention is able to overcome the shortcomings of prior art devices by providing a carrying case for a pager which is compact, lightweight decorative and wearable. The carrying case for a pager also eliminates the need to wear a clothing to which a clip is attachable and is formed of a material which does not impede access to the buttons and switches of the pager. The carrying case for a pager also includes an attachment for an interchangeable decorative chain or cord whereby an individual can hang carrying case from their person, such as, around their neck and an electromagnetic shield for shielding items carried within the pocket which may be adversely affected by a magnetic field or for individuals who feel a magnetic field poses a health issue. Furthermore, the carrying case for a pager of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A carrying case for a pager comprising:

a) a pouch including first and second compartments, said first compartment for receiving the pager therein and a second compartment for receiving other items;

b) means for shielding electromagnetic waves produced by the pager positioned within one of said first and second compartments; and c) means for selectively covering said first and second compartments to secure the pager within said first compartment whereby the pager is fully operational and viewable when positioned within said first compartment and covered by said means for selectively covering wherein said means for selectively covering includes means to view the display of the pager, said means for selectively covering comprising a cover extending from and integral with a front face of said pouch, extending over a top opening of said pouch to a rear face of said pouch, said cover forming a flap over said rear face;

d) means for releasably securing said flap to the rear face of said pouch comprising a snap located adjacent a free end of said flap:

e) means for releasably connecting said pouch to a body part of a user comprising a chain , first and second rings connected to said flap below the top of said pouch, and first and second hooks at first and second ends of said chain releasably engaging said first and second rings, respectively.

2. The carrying case for a pager as recited in claim 1, wherein said pouch is made of a light weight material through which the user is able to view a display on the pager.

3. The carrying case for a pager as recited in claim 2, wherein said material allows any audible alarm signal generated by the pager to be heard therethrough.

4. The carrying case for a pager as recited in claim 2, wherein said material is a mesh weave.

5. The carrying case for a pager as recited in claim 1 wherein said chain is a necklace.

6. The carrying case for a pager as recited in claim 1 wherein said chain is a bracelet.

* * * * *